United States Patent [19]

Moore et al.

[11] Patent Number: 5,195,392
[45] Date of Patent: Mar. 23, 1993

[54] INTERNAL PIPE INSPECTION SYSTEM

[75] Inventors: Joseph P. Moore, Clinton; Andrew J. Kudarauskas; Theodore J. Kliszczewicz, both of Liverpool; John E. Allen, Altamont, all of N.Y.; Allan T. Fisk, Needham, Mass.; Philip R. Lichtman, Newton, Mass.; Gerald A. Avarbock, Brockton, Mass.; Linda T. Ystueta, Allston, Mass.

[73] Assignee: Niagara Mohawk Power Corporation, Syrcuse, N.Y.

[21] Appl. No.: 523,323

[22] Filed: May 14, 1990

[51] Int. Cl.$^5$ ............... G01M 19/00; F16L 55/18; F16L 55/26
[52] U.S. Cl. ............... 73/866.5; 138/97; 356/241; 358/100
[58] Field of Search ............ 73/865.8, 866.5, 40.5 A, 73/40.5 R, 623, 49.1, 49.5, 40.5 P; 324/220, 221; 33/544, 544.1, 544.2, 544.3; 378/59, 60; 254/134.3 FT; 358/100; 138/97, 108; 104/138.1, 138.2; 356/237, 241, 378

[56] References Cited

U.S. PATENT DOCUMENTS

| | | | |
|---|---|---|---|
| 1,130,775 | 3/1915 | Toffey | 254/134.3 FT |
| 1,666,980 | 4/1928 | Sharp | 254/134.3 FT |
| 1,751,415 | 3/1930 | McCaffrey | 254/134.3 FT X |
| 2,122,697 | 7/1938 | Potter | 73/866.5 X |
| 2,219,555 | 10/1940 | Burwell | 254/134.3 FT X |
| 3,267,967 | 8/1966 | Guthrie | 138/97 |
| 3,439,527 | 4/1969 | Rohrer | 73/40.5 A |
| 3,612,487 | 10/1971 | Raney et al. | 73/866.5 X |
| 3,718,978 | 3/1973 | Van Koevering et al. | 138/97 X |
| 4,090,534 | 5/1978 | Martin et al. | 138/97 |
| 4,197,908 | 4/1980 | Davis et al. | 166/55 |
| 4,201,597 | 5/1980 | Armstrong et al. | 358/100 X |
| 4,253,497 | 3/1981 | Martin et al. | 138/97 |
| 4,261,204 | 4/1981 | Donaldson | 73/40.5 R X |
| 4,497,332 | 2/1985 | Sewell et al. | 137/15 |
| 4,538,316 | 9/1985 | Reinhart et al. | 15/104.06 R |
| 4,644,791 | 2/1987 | Sonoda et al. | 73/866.5 |
| 4,646,787 | 3/1987 | Rush et al. | 73/40.5 R X |
| 4,651,559 | 3/1987 | Horigome et al. | 73/40.5 R |
| 4,690,006 | 9/1987 | Urata | 73/866.5 |
| 4,779,496 | 10/1988 | Evans et al. | 82/82 |
| 4,843,896 | 7/1989 | Napeloni et al. | 73/866.5 |

FOREIGN PATENT DOCUMENTS

| | | | |
|---|---|---|---|
| 83759 | 7/1983 | European Pat. Off. | 356/241 |
| 0085504 | 10/1983 | European Pat. Off. | |
| 2637043 | 3/1990 | France . | |
| 50255 | 4/1977 | Japan | 356/241 |
| 188579 | 8/1988 | Japan | 358/100 |
| 57974 | 2/1990 | Japan | 73/866.5 |
| WO83/03457 | 10/1983 | PCT Int'l Appl. . | |
| 680094 | 8/1979 | U.S.S.R. | 254/134.3 FT |
| 1263717 | 2/1972 | United Kingdom | 73/865.8 |
| 2144009 | 2/1985 | United Kingdom . | |
| 2172079 | 9/1986 | United Kingdom . | |

OTHER PUBLICATIONS

Inspection Systems & Services Brochure, PLS International, Mar. 13, 1989, 4 pages.

(List continued on next page.)

Primary Examiner—Tom Noland
Attorney, Agent, or Firm—Heslin & Roghenberg

[57] ABSTRACT

Internal pipe inspection apparatus and an in-line pipe head are disclosed. The inspection apparatus is insertable into either a four inch or six inch pipeline through a standard service size opening. The apparatus includes a compact pipe head having a viewing assembly for imaging the interior of the pipe. The head is sized to pass through the standard lateral service opening, the opening being substantially less in size than the diameter of the pipe. A flexible steel snake is connected to the head for manually moving and rotating the head within the pipe once the head is positioned therein. The apparatus is intrinsically safe for inspection of a live natural gas main. Various centralizing member embodiments are disclosed for positioning the pipe head viewing assembly substantially concentric with the axis of the pipe.

45 Claims, 10 Drawing Sheets

OTHER PUBLICATIONS

Minicamera Inspection System Brochure, PLS International, Mar. 13, 1989, 4 pages.

World's Leading Manufacturer of Sewer Line Inspection and Joint Sealing Equipment–Cues Mar. 13, 1989, 23 pages.

Solid State Television Inspection System, Pierpoint Flexiprobe, 1987, 8 pages.

TV Inspection System FS 5030 A, Avanti International, 1988–1989, 4 pages.

TV Inspection System FS 5026 A, Avanti International, (Sep. 1988), 2 pages.

TV Inspection System FS 5028A, Avanti International (Sep. 1988), 2 pages.

Compact Color TV Camera, Osaka Gas Engineering (date unknown), but by May 10, 1990; 2 pages.

Model 1065 Sewer-Raider Electric Sewer Cleaner, Spartan Tool (date unknown), but by May 10, 1990, 2 pages.

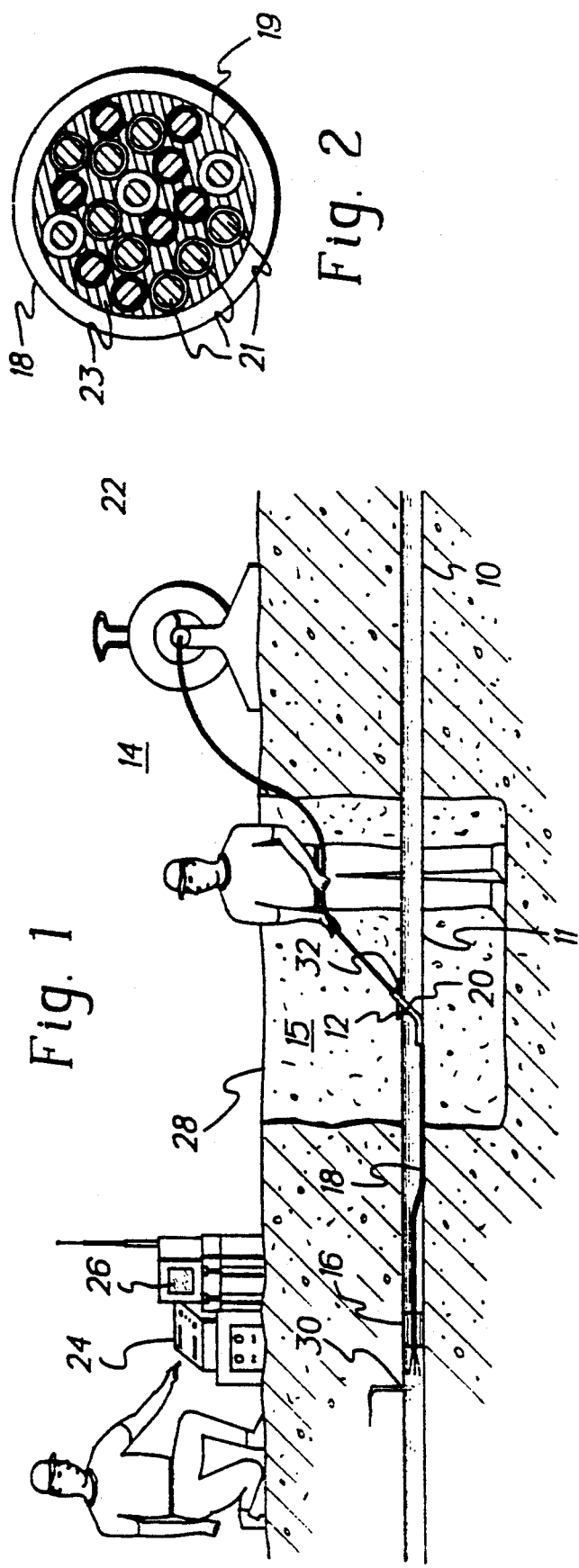
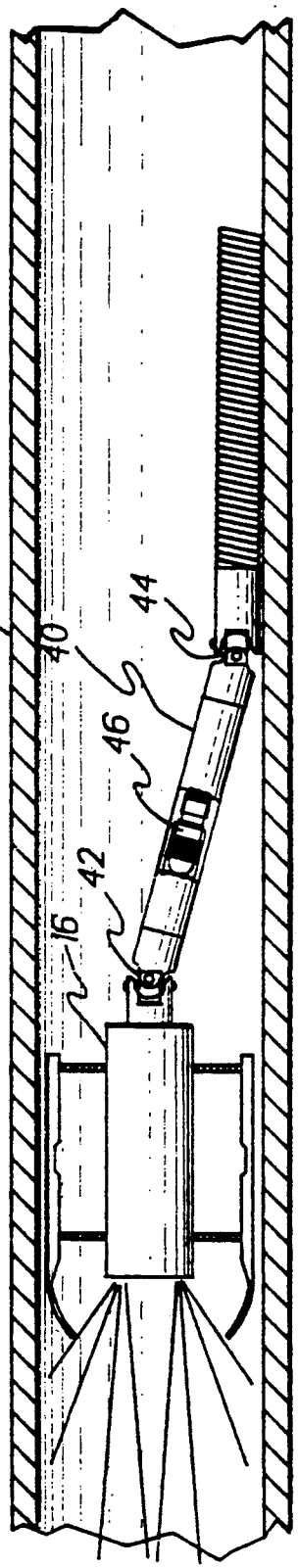

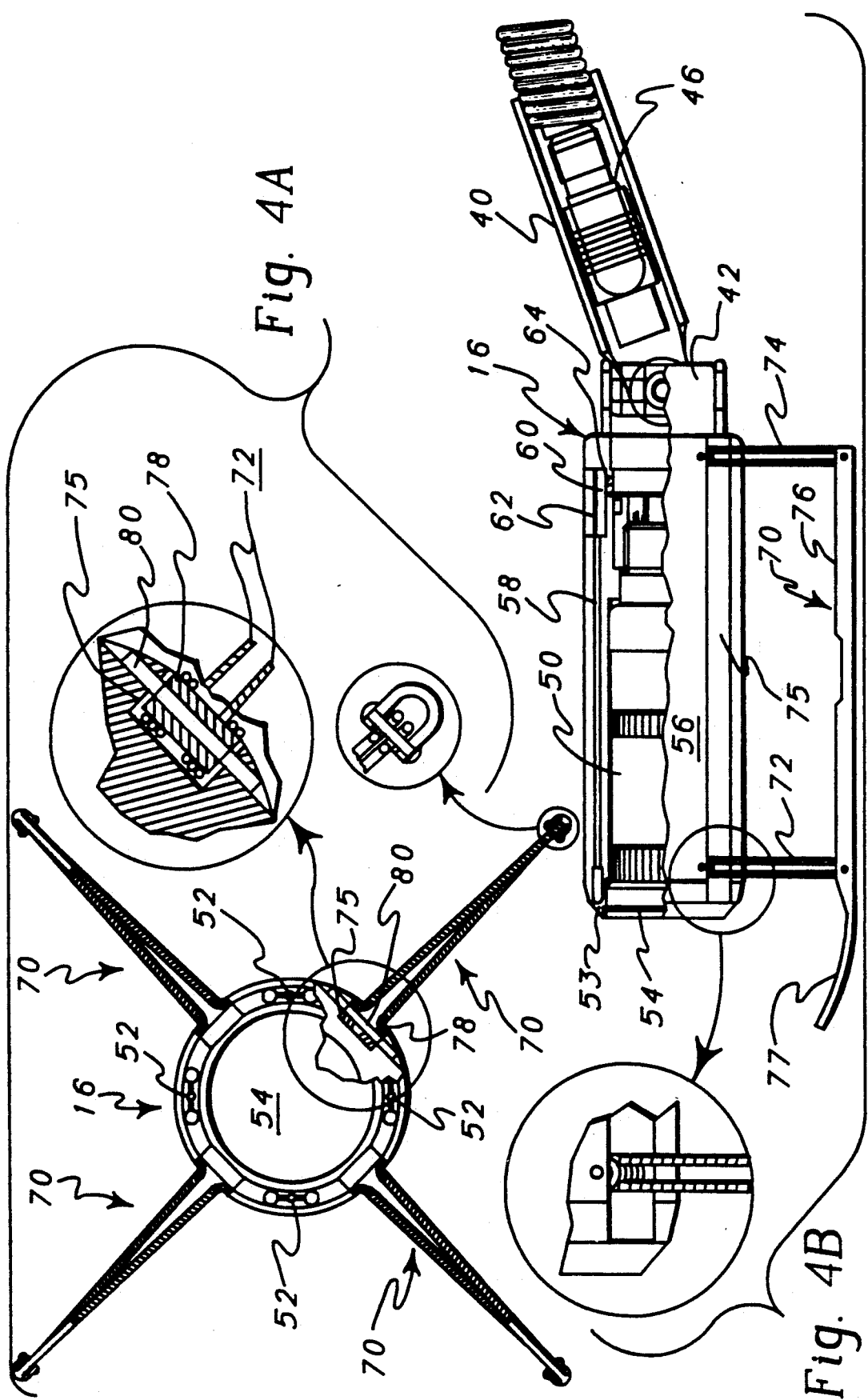

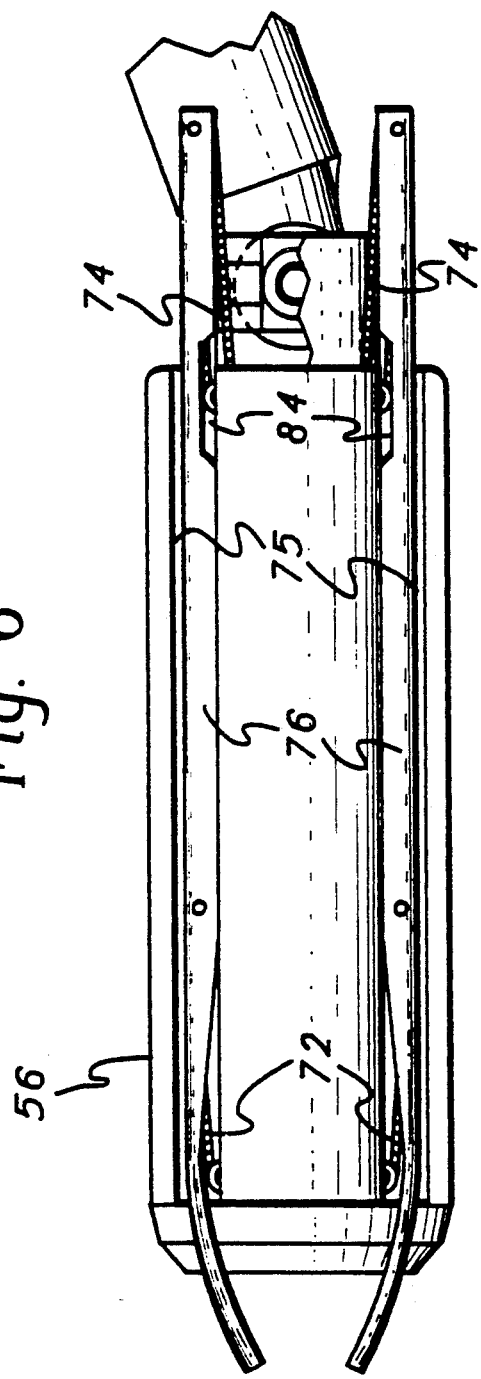

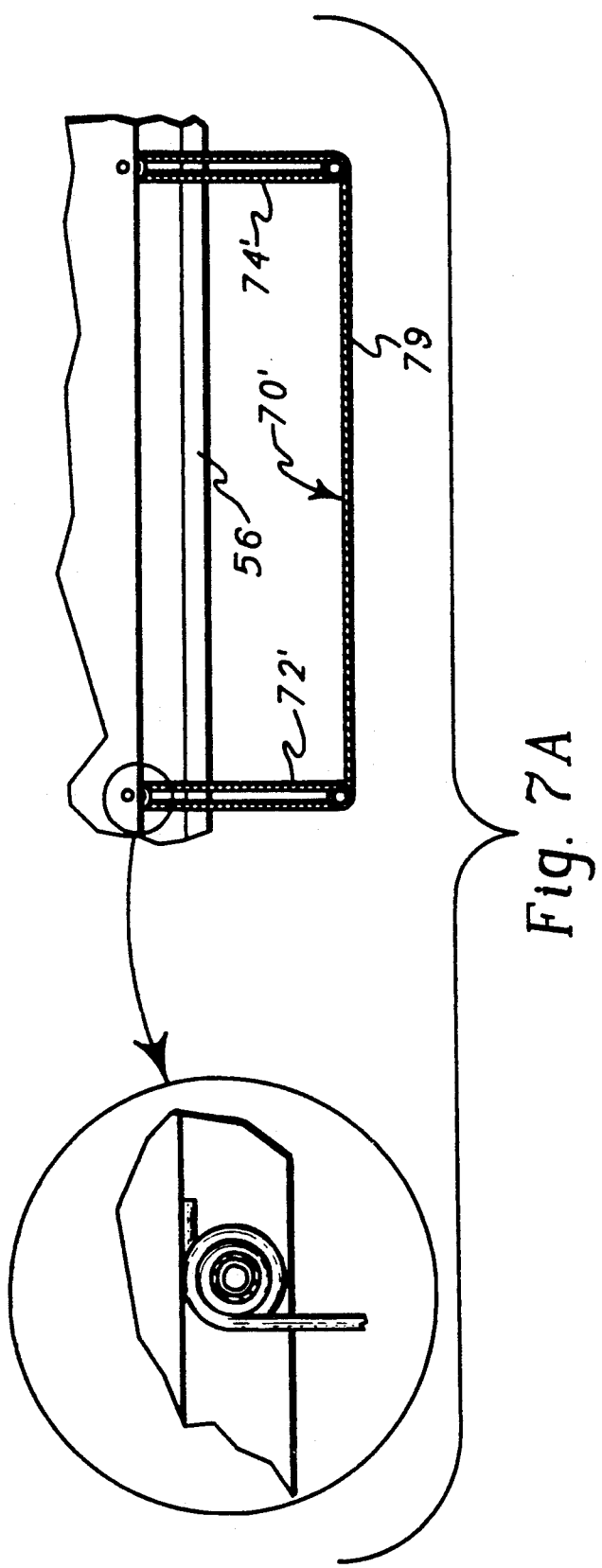
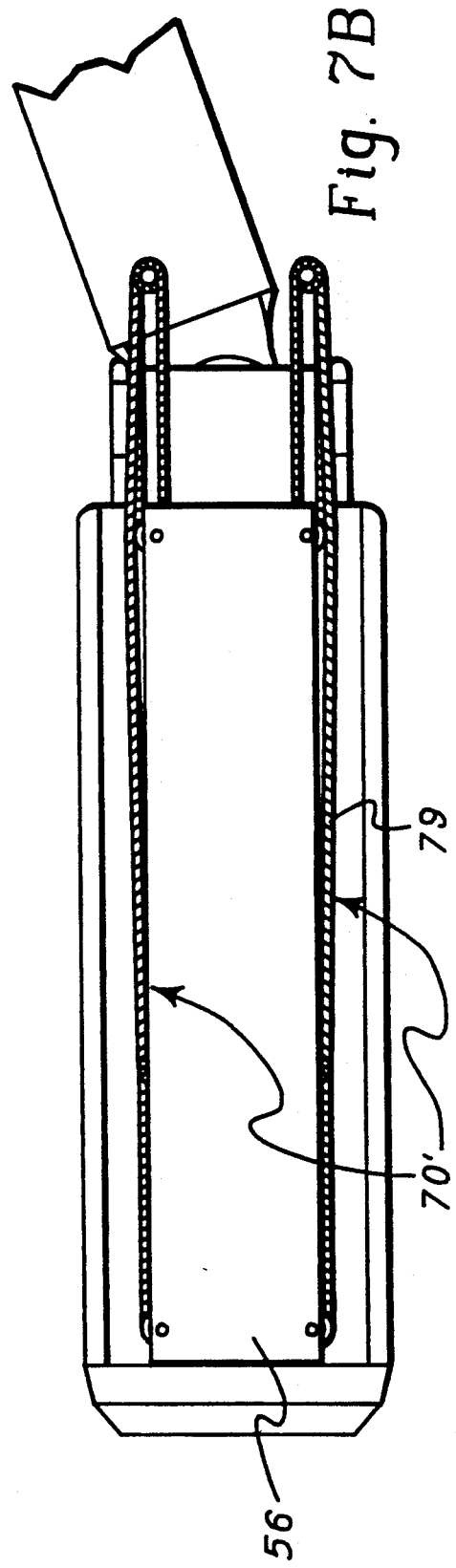
Fig. 7A
Fig. 7B

INTERNAL PIPE INSPECTION SYSTEM

BACKGROUND OF THE INVENTION

1. Technical Field

This invention relates in general to devices and methods for inspection and repair of piping, such as fluid distribution means, and in particular, to devices and methods for inspecting gas mains without interrupting gas service during the testing operation.

2. Description of the Prior Art

The transportation of natural gas, water, petroleum products, and other gases and fluids typically involves the use of pipelines, often of considerable lengths. Cross-country pipelines are, of course, of large diameters such as 12 inches, 24 inches and 30 inches in capacity. Such pipeline sizes are usually associated with the transporting of natural gas, and large sizes of pipes are normally fabricated of steel. In urban areas distribution of natural gas, and the distribution of manufactured gas in previous years, is accomplished through vast networks of smaller size buried pipe, principally of four inch and six inch diameters. While present installation of underground pipe utilizes steel, particularly for natural gas of the four inch and six inch diameter size, thousands of miles of cast iron pipe have been installed and buried over the years, and are presently in use for the delivery of natural gas. In most of the United States cast iron gas distribution lines are often of four inches in diameter and typically include many 90 degree corners. Common problems encountered with buried cast iron pipe include deflection of the pipe caused by settling of the earth around the pipe, heaving due to frost (or forces applied to the earth around the pipe) causing cracking of the line and, often, the collection of water therein.

While numerous devices exist for the visual or other inspection of the interior of a pipeline, most, if not all, existing techniques have disadvantages which make their use at best inconvenient and, in all likelihood, difficult, time consuming and/or expensive. Many in-line pipe inspection devices and methods require, for example, in the case of gas pipe lines, discontinuance of service and/or severing of the main for insertion of the inspection device from an open end of the main, which is a complicated and costly process involving bypass and stop-off procedures. Obviously, this technique is expensive both in terms of the interruption to the gas service and the damage caused to the gas main. Inspection devices so inserted may include a fixed centralizer feature for maintaining the in-line viewing assembly substantially concentric with the axis of the pipe.

There exists a genuine need in the field for a more practical, efficient and effective system and method for viewing the interior of a pipe, and particularly, a four inch or six inch diameter gas distribution pipe.

SUMMARY OF THE INVENTION

Briefly described, the present invention comprises in one aspect several novel in-line inspection or repair head designs capable of being inserted into a pipe through a lateral opening of diameter smaller than the diameter of the pipe. In one basic embodiment, the novel head includes a central body and at least three outwardly biased centralizing members extending from the body. The members are substantially symmetrically arranged about the body and are sized such that the body is approximately radially centered about the axis of the pipe when the head is positioned within the pipe. Each of the members includes at least one spring biased leg pivotably secured at its radially inner end to the body and a ski hingedly secured to the radially outer end of the leg. The members are independently collapsible towards the body such that the inspection or repair head can readily pass a pipe obstruction or for facilitating the head's insertion into and removal from the pipe. The head is specifically designed to pass into a pipe through a lateral opening of diameter smaller than the pipe diameter. Additional inspection/repair head embodiments are described and claimed herein.

In another aspect, the present invention comprises a pipe inspection apparatus which has an inspection head which is insertable into a pipeline through a lateral opening of diameter smaller than the diameter of the pipeline. The compact inspection head has a central body portion including a viewing assembly for remote imaging of the interior of the pipe. The apparatus also includes a flexible snake capable of being affixed to the head for manually moving and rotating the inspection head within the pipe.

In an enhanced version, at least one centering member is affixed to the body portion for substantially radially centering the viewing assembly within the pipe. The centering member is collapsible towards the body to circumvent a pipe obstruction, traverse a pipe turn and facilitate the head's insertion into and removal from the pipe through the restricted lateral pipe opening. In a further embodiment of the pipe inspection apparatus, the centering member comprises at least three centralizing members which are symmetrically arranged about the circumference the central body portion. Each of these members includes two bi-directional torsion spring legs which are pivotably secured to the body at one end and hingedly secured to a skid at the other end. The skid is sized to interconnect the two bi-directional legs of each centralizing member. Also in an enhanced version, the pipe inspection apparatus is designed for intrinsic safety for use within an operating gas pipeline.

Accordingly, a principal object of the present invention is to provide an inspection/repair head capable of being inserted into and removed from a pipe through a lateral opening of diameter smaller than the diameter of the pipe.

Another object of the present invention is to provide an intrinsically safe inspection/repair head and pipe inspection apparatus for use within a live gas pipeline.

Yet another object of the present invention is to provide an improved pipe inspection apparatus for visually evaluating the interior of a pipe and the integrity of a pipe wall.

Still another object of the present invention is to provide an inspection/repair head and pipe inspection apparatus which do not significantly block fluid flow within the pipe.

A further object of the present invention is to provide an inspection/repair head and pipe inspection apparatus which, when in use within a gas main, minimize the creation of dust clouds.

A still further object of the present invention is to provide an inspection/repair head and pipe inspection apparatus capable of being inserted into a pipe through a conventional lateral service opening and expanding upon insertion into the pipe such that the viewing means is approximately concentric with the pipe axis.

A yet further object of the present invention is to provide an inspection/repair head and pipe inspection apparatus capable of operating within a four inch or six inch diameter natural gas pipeline and capable of being inserted into and removed from the pipeline through a 1¼ inch NPT lateral service tap.

BRIEF DESCRIPTION OF THE DRAWINGS

These and other objects, advantages and features of the present invention will be more readily understood from the following detailed description of certain preferred embodiments of the present invention, when considered in conjunction with the accompanying drawings in which:

FIG. 1 is a side elevational operational overview of the inspection system of the present invention;

FIG. 2 is a cross-sectional view of one embodiment of the inspection head propelling snake shown in FIG. 1;

FIG. 3 is an enlarged side elevational view of the inspection head, connector tube and propelling snake depicted in FIG. 1;

FIG. 4A is a front elevational view with a partial cutaway of the leg connection to the central body of the inspection head of FIG. 3;

FIG. 4B is a partially cutaway side elevational view of the inspection head and connector tube of FIG. 3;

FIG. 6 is an enlarged side elevational view of the inspection head of FIG. 5 shown with the centering members in a collapsed position against the central body;

FIG. 7A is a side elevational view of an alternate embodiment of the centralizing members depicted in FIGS. 3-6;

FIG. 7B is a side elevational view of the inspection head and connector tube showing the centralizing members of FIG. 7A in collapsed positions;

DETAILED DESCRIPTION OF THE INVENTION

Figure 5:
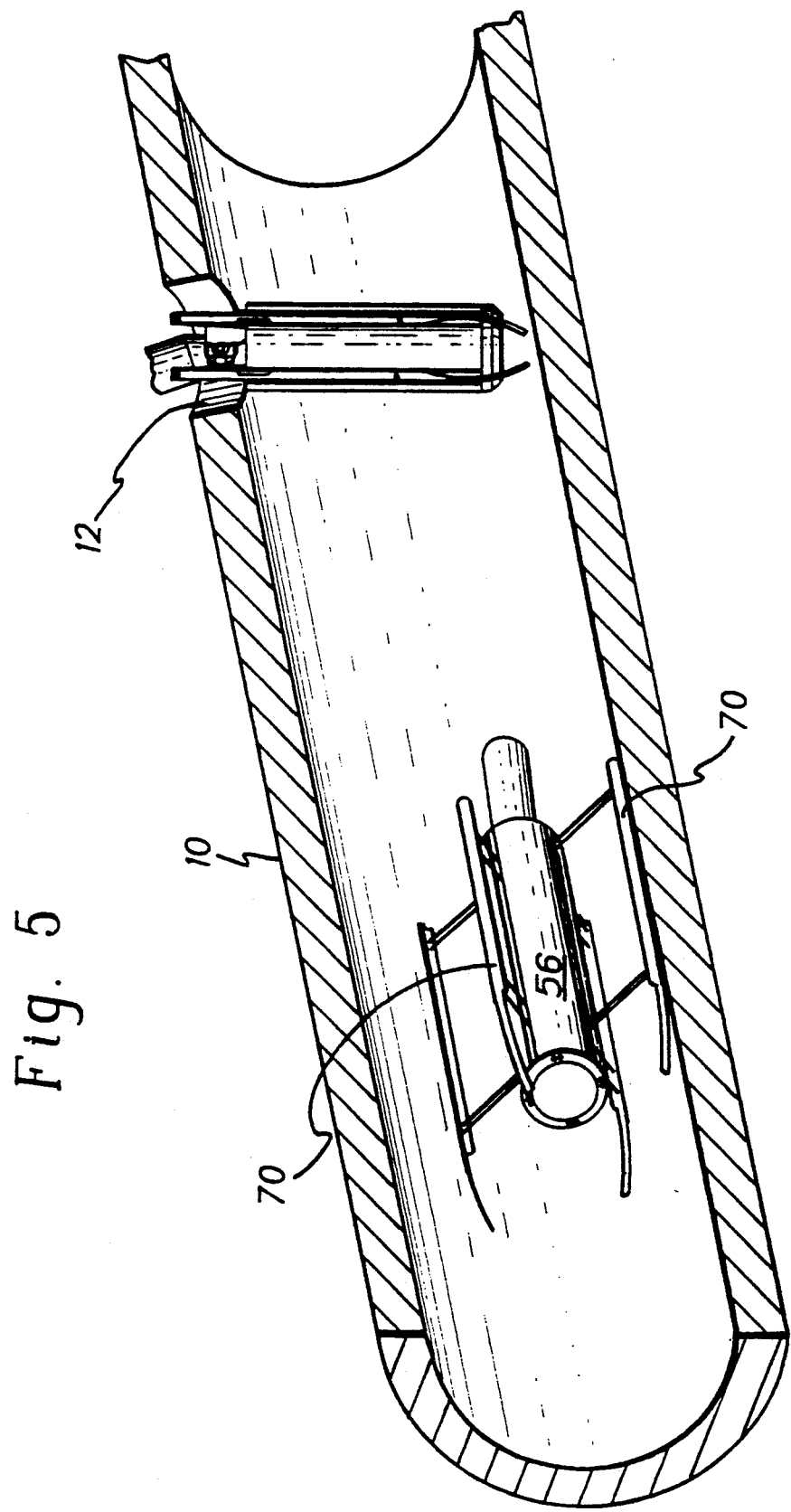
FIG. 5 is an isometric view of the inspection head of FIG. 3 shown in collapsed and operational positions.

An operational overview of one embodiment of the inspection apparatus of the present invention is depicted in FIG. 1. As shown, a section 11 of a pipe 10, such as a natural gas pipe (or water pipe, sewer pipe, etc.), is initially exposed or uncovered (i.e., if necessary), in this case through a ground opening 15. Preferably, opening 15 is located to expose a pipe section 11 having an existing, conventional lateral service opening 12 which may be used for access to the interior of pipe 10 without drilling the pipe. Alternatively, with the present invention lateral pipe opening 12 can be drilled with any standard service tapping equipment, an option which represents an important advantage of the present invention.

The inspection apparatus, generally denoted 14, includes an inspection head 16, an externally pushed duct rod or, more preferably, a centerless snake 18, an input-guide tube 20, a snake storage drum 22, and a control unit 24, which includes a viewer screen 26. Control unit 24 electrically communicates with head 16 via a cabling line 28 between unit 24 and drum 22 and a plurality of electrical conductors 21 (see FIG. 2) embedded within the center of snake 18. System 14 is designed to detect, for example, a crack or leak 30 within the wall of pipe 10 up to 150 feet from the point of introduction of inspection head 16 into the pipe. Other uses include generalized inspections, searching for water or ice induced blockages, and close inspection of bell joints and service tees. Non-inspection type uses of the apparatus and, in particular, head 16 are also conceivable by those skilled in the art.

One important advantage of system 14 of the present invention is its ability to safely operate to inspect a live gas main, and in particular a small four inch gas main. As a further advantage, damage to the main is minimized by inserting, controlling and removing the in-line inspection head through a conventionally sized lateral service opening, thus eliminating the prior need to 'break' a gas main for insertion of the inspection device, thereby avoiding complicated bypass and stop-off procedures. Since the main is live, natural gas leakage through lateral opening 12 is reduced by a closed cell rubber seal or gasket 32 surrounding snake insertion tube 20. Tube 20 is curved as shown to facilitate insertion, rotation and removal of snake 18 within and from pipe 10 at the bend from opening 12 to the lowermost surface of pipe 10. A closed cell foam material (not shown) also preferably surrounds snake 18 within tube 20 to inhibit the escape of natural gas through the sleeve. In operation, after insertion of inspection head 16 within pipe 10 through opening 12, tube 20 is positioned about snake 18 within pipe 10 as depicted and clamped in place, for example, by use of chain pipe clamps (not shown), which are well known in the art.

Apparatus 14 is operated by two individuals in FIG. 1, one individual manually inserts, feeds and rotates the snake within pipe 10, and the other individual views the image presented in real time on screen display 26 and operates illuminating lights within inspection head 16 via control unit 24 (as described further below). Alternatively, one operator can manage the system either from within ground opening 15 or on the surface near the opening. If on the surface, then insertion tube 20 is preferably extended upwards several feet or more in length to facilitate the operator's control of snake 18 and hence head 16.

The main components of inspection apparatus 14 are discussed below in detail with reference to FIGS. 2-14.

As can be seen from FIGS. 2 & 3, snake 18 preferably comprises a close spiral wound, steel wire 'sewer-type' snake having a central opening 19. Snake 18 is centerless to allow the passage of conductors 21 from head 16 to the storage drum and hence control unit 24 via line 28. Conductors 21 are sealed within a silicon potting compound 23 which prevents the escape of fluid, such as natural gas, through the center of snake 18. Snake 18 is stored in coiled form in and dispensed from rotatable storage drum 22. If desired, distance markings (not shown) can be provided on snake 18 for identifying the distance traveled by inspection head 16 within pipe 10.

Preferably snake rotation is a manual function, even though commercially available snakes often include electrically powered drum rotation. Neither the speed nor torque provided by such an electrically powered drum are needed to implement this invention. When rotation of snake 18 is required to align the video image or assist in feeding the snake, one of the operators can rotate snake storage drum 22 by hand which, in turn, will rotate snake 18 and head 16. In an enhanced version, drum 22 includes an optional automatic snake feed wherein snake 18 is slowly fed in the forward direction or retracted in the reverse direction as the drum rotates. Such an auto feed mechanism, which does not require electrical power, should enable the operator to finesse positioning of the inspection head better than by simple manual pushing and pulling on the snake, particularly at extended distances, such as up to 150 feet. The auto feed mechanism is typically disengaged via a single lever (not shown), so that the operator can rapidly feed or retract the snake by hand when desired.

As shown in FIG. 3, head 16 connects to snake 18 via a connector tube 40. Tube 40 comprises a relatively light weight link which prevents the weight of snake 18 from affecting the orientation of head 16 within pipe 10. Tube 40 has a hollow universal type connection at each end. A first universal joint 42 connects inspection head 16 to one end of tube 40 and a second universal joint 44 connects the other end of tube 40 to snake 18. Within connector tube 40 waterproof connection 46 is made between the wires from head 16 (discussed below), which pass through joint 42, and the conductors 21 embedded within snake 18, which pass through joint 44. This waterproof connection 46 is depicted as a conventional quick connect male/female type electrical connection.

Referring now to FIGS. 4A & 4B, inspection head 16 includes a state of the art type camera assembly, which includes a camera assembly 50, e.g. a CCD surveillance camera assembly, and an illuminating system having a number of light sets 52 surrounding the lens 54 of camera 50. Table 1 lists several CCD surveillance cameras with a remote camera assembly and their specifications. Any one of these, or any similar type camera, could conceivably be used in implementing the present invention depending upon the sizing constraints within which system 14 must operate.

TABLE 1

| Model | Resolution (TV Lines (H)) | Size (in.) | Cost* |
|---|---|---|---|
| Elmo EM-102 B/W | 420 | 0.68 dia × 2.08 | M |
| Elmo EM-102 (Color) | 360 | 0.68 dia × 2.08 | H |
| Toshiba 1K-M30MA | 420 | 0.68 dia × 2.08 | M |
| Toshiba 1K-M30A (color) | 360 | 0.68 dia × 2.08 | H |
| Lionel | 120 | 1 × 1.2 × 5 | L |
| Panasonic WV-CD1 B/W | 380 | 0.78 dia × 2.64 | H |
| Panasonic WV-CD2 (color) | 380 | 0.78 dia × 2.64 | H |

*H = High; M = Medium; L = Low plus modifications

The Elmo EM-102 B/W CCD camera is preferred as having the highest resolution, smallest size, and largest demonstrated range. This camera requires a minimum of 3 lux illumination with a recommended value of 20 lux. Color video would provide more information to the operator than would a black and white picture; however, with existing technology black and white cameras as a rule offer better resolution, lower light sensitivity and lower cost than color cameras. Tests have indicated that the information in a black and white picture is adequate for internal pipe inspection purposes. As imaging technology develops, however, it is anticipated that a color camera capable of operating within the constraints of the present invention will become available.

As described further below, the camera control unit for the Elmo EM-102 B/W CCD camera (which is part of the commercially available package) is embedded within control unit 24 (FIG. 1). In a preferred embodiment, approximately 165 feet of conductor cable is provided between inspection head 16 and control unit 24. This figure has been chosen to provide approximately 150 feet of in-pipe inspection distance. With such a configuration, it has been determined that a half closed camera iris produces the best compromise between depth of field and light sensitivity within pipe 10. Both 3 millimeter and 4 millimeter focal length lenses provide a sufficiently wide angle of view to properly inspect the inner pipe wall of a 4 inch diameter pipe.

The Elmo EM-102 B/W CCD camera assembly 50 is mounted within a housing or body 56, along with the smallest operable illumination sources 52, which will still allow head 16 to fit through a 1¼ inch NPT service tap, i.e., one "standard" service opening for 4 inch and 6 inch cast iron gas pipe. A second standard lateral service opening is a 1 inch NPT service tap. If only this smaller size is available, then a convention redrill/retap operation is conducted and the service reconnection is therefore of 1¼ inch size. It is anticipated that future technology will eventually result in a camera head sufficiently small in diameter and length to allow passage of head 16 of the present invention through the 1 inch NPT service tap. Body 56 is preferably made of aluminum or stainless steel, both for strength and to conduct heat away from camera assembly 50.

As already noted, one object of the present invention is to provide an intrinsically safe system for inspecting the interior walls of a live gas main. In order to meet intrinsic safety (IS) requirements the electrical power for illumination of the pipe interior must lie below certain current, voltage and stored energy values. Specifically, in order for the system to be made intrinsically safe, an unsafe arc must not occur in a hazardous area (i.e., an area where a combustible gas mixture is or can be present). This requires that the potential energy release of all circuits and components in the hazardous area be maintained below a critical level.

Over the past two decades several standards and recommended practices have been developed, both in the United States and other countries, to cover safe methods and designs of equipment for use in explosive atmospheres. In the United States the most commonly referenced standards and practices for use where methane/air mixtures may be present are:

| | |
|---|---|
| NFPA 70 | National Electrical Code. |
| NFPA 493 | Intrinsically Safe Apparatus for use in Division I Hazardous Locations. |
| NFPA 496 | Purged Enclosures for Electrical Equipment in Hazardous Locations. |
| NFPA 497 | Classification of Class I Hazardous Locations for Electrical Installations. |
| ANSI C39.5 | Safety requirements for electrical and electronic |

| | -continued |
|---|---|
| | measuring and controlling instrumentation. |
| ANSI/ISA | RP12 6 Installation of Intrinsically Safe Instrumentation Systems in Class I Hazardous Locations. |
| UL 913 | Intrinsically Safe Electrical Circuits and Apparatus for use in Hazardous Locations and its associated apparatus. |
| FM 3610 | Intrinsically Safe Apparatus and Associated Apparatus for use in Class I, II, and III |
| FM 3615 | Explosion-proof Electrical Equipment |

Wherein:

| | |
|---|---|
| ANSI | American National Standards Institute New York, NY 10018 |
| FM | Factory Mutual Research Corporation Norwood, MA 02062 |
| ISA | Instrument Society of America Research Triangle Park, NC 27709 |
| NFPA | National Fire Protection Association Quincy, MA 02269 |
| UL | Underwriters Laboratories, Inc. Northbrook, IL 60062 |

Further information on the history and principles of intrinsic safety may be obtained from the following books (available from the instrument Society of America):

*Intrinsic Safety*, by E. C. Magison published 1984

*Intrinsically Safe Instrumentation*, by Rob Garside, published 1983

*Electrical Instruments in Hazardous Locations*, by Ernest C. Magison, published 1978

Another power constraint on inspection head 16 results from the desire for all wiring to fit within the central snake bore 19, which in a preferred embodiment is approximately 0.270 inches in diameter. Since the densely packed cable from the camera assembly (which for the referenced Elmo camera consists of 11 conductors; namely, 3 large 50 ohms coax and 5 small 50 ohms coax cables, and three 26-AWG power wires) occupies most of this space, there is only room for a few small diameter wires (approximately 28–30 gauge) for powering the light circuits. Such wires are generally rated for maximum current of about 2 amps.

Available lighting options include fiber optic bundles, light emitting diodes, vacuum tungsten filament lamps and halogen tungsten filament lamps. For various reasons, the vacuum tungsten filament lamps are considered best for implementing the lighting system. Although the halogen lamps are more efficient, concerns for safety and ruggedness make them a less attractive option. The commercially available Gilway 4115-1 lamp is presently preferred. This lamp has a very small diameter (less than 0.10 inches), good light output, low operating temperature, low power requirements and a long life. As shown in FIG. 4A, eight of these lamps, located in sets of two are symmetrically arranged in a ring around the circumference of camera lens 54. This arrangement provides good visibility of pipe detail up to approximately 2 feet in front of the camera, i.e., with the referenced Elmo CCD camera and a half closed iris.

Intrinsic safety is a critical issue for filament lamps due to the high temperature of the filament and the relatively high probability that a bulb will break. IS testing of the Gilway 4115-1 lamp has successfully been conducted. If desired, as an alternative lighting source infra red LED's may be used in combination with removing the infra red filter included with the commercially available Elmo EM-102 B/W camera unit.

As shown in FIG. 4B, head 16 includes a forward facing groove (or grooves) 53 for receiving light sets 52 and an elongate groove 58 from each light set, for accommodating the electric wires (not shown) for each set, to an access hole 60 having a cover 62. From access compartment 60, the lighting wires pass, along with the 11 output conductors standard with the Elmo camera assembly, through the back of head 16 and the center of universal joint 42 to connector 46.

Also partially depicted in FIG. 4B is one of several novel, identical centralizing members, generally denoted 70, which are sized to position camera assembly 50 substantially concentric with the axis of a pipe under inspection. In this first embodiment, each member 70 has two leg assemblies 72 and 74 which are, for example, opposed pairs of torsional springs biased to extend outwardly from the camera head. Leg assemblies 72 and 74 are interconnected by a skid 76. Each radially inner leg end is pivotally connected to body 56 and each radially outer leg end is hingedly connected to skid 76 in a manner to allow collapsing of member 70 in a forward or reverse direction relative to body 56.

As shown in FIG. 4A, four members 70 are preferably substantially symmetrically arranged about body 56. At least three symmetrically arranged centralizing members are required to position body 56 roughly concentric with the axis of pipe 10. The opposite wound feature of the radially extended torsion spring leg assemblies cause the member to typically remain centered and extended with the legs positioned radial and the skis axial the pipe. Normally, the springs have a certain amount of preload to prevent backlash or play when the member is in such a position. This preload arrangement provides the best bi-directional centering action for the camera within the pipe. Should the inspection head encounter any obstructions during its passage through the pipe, either in a forward or backward direction, each centralizer member is independently able to deflect from its extended centering position. In fact, one or more member may collapse completely to a legs axial position if necessary, thus enabling even large obstructions to be negotiated.

In a preferred embodiment, the radial leg assemblies 72, 74 of centralizing member 70 each comprise a one-piece bi-directional torsion spring instead of opposed pairs. In such a case, the radially outer ends of the legs are simple loops.

The base projections or tangs (not shown) of each torsion spring rest on or reside against a common surface formed in body 56 such as groove 75. A cutaway of one such connection is depicted in FIG. 4A. As shown, the radially inner end of springs 72 (& 74) are wrapped around a bushing 78 where they pivot in a forward or reverse direction on a common shaft 80. The radially outer ends of legs 72, 74 are hinged to opposite ends of a common link, such as skid member 76. The leg/skid hinge points may be simple rivets, in which case legs 72 & 74 and skid 76 may have simple loops or eyes through which the rivets may pass. Those skilled in the art will recognize that other pivot and hinge arrangements may be equally effective.

When a member deflects to the rear, for example, two torsion springs (one in each leg) come into play. These first two springs are deflected while the second two springs rotate freely about their shafts with no "windup" (once their preload, if any, is relaxed). For a forward deflection, the opposite condition exits; the first two springs rotate freely while the second two deflect. All four springs of a given member need not have the same spring rate, though that is the simplest arrangement. It is only necessary that the sum of the spring preloads be algebraically self cancelling for the member to be centered and extended. Certain radial legs may have a zero spring rate, i.e., they may not be springs at all. It is also possible for one radial leg to be comprised of a single bi-directional torsion spring rather than two oppositely wound torsion springs.

As shown in FIGS. 4A & 4B, skid 76 has a substantially U-shape when viewed in cross-section and is formed with a forward extending inwardly curved portion 77 for facilitating movement of skid 76 over obstacles when head 16 is propelled in a forward direction, thus facilitating maintenance of camera assembly 50 in a roughly concentric position with the pipe axis. If desired, a similar type extension might be employed at the opposite end of skid 76. However, tests have shown this to be unnecessary when the viewing of the pipe interior is conducted as the head is pushed in a forward direction.

Members 70 manually collapse to allow body 56 to pass through a standard lateral service opening and then rotate approximately 90 degrees into alignment with the pipe (see FIG. 5). Once head 16 is within pipe 10, centralizing members 70 expand to bring body 56, and therefore camera assembly 50, into substantial concentricity with the pipe axis. As noted the centralizing members also collapse when reversing the procedure to extract the head from the pipe through the restricted lateral opening.

Member 70 is depicted fully collapsed against body 56 in FIG. 6. As shown, a lengthwise extending groove 75 is provided along body 56 for receiving leg assemblies 72 and 74 and skid 76 of member 70. Notch 84 in skid 76 is located and sized for accommodating the leg connections to body 56, i.e., either the leg 74 connection when member 70 is collapsed as shown or the leg 72 connection when collapsed in a forward direction (not shown).

A second and preferred centralizing member embodiment of the present invention, generally denoted 70', is shown in FIGS. 7A & 7B. As with the first embodiment, this configuration uses two radially extending torsion spring leg assemblies identical to legs 72 & 74 of the prior embodiment. The pivotal connections of these legs to body 56 are also the same. The essential structural difference between members 70 and 70' comprises the use of a spring wire link 79 to interconnect the outer radial ends of the torsional spring leg assemblies. Member 70' is depicted in collapsed position in FIG. 7B. As shown, wire 79 flexes about the connection of the radial leg to body 56. Wire 79 then straightens when member 70' extends (FIG. 7A) within pipe 10 to position the camera assembly.

Figure 8:
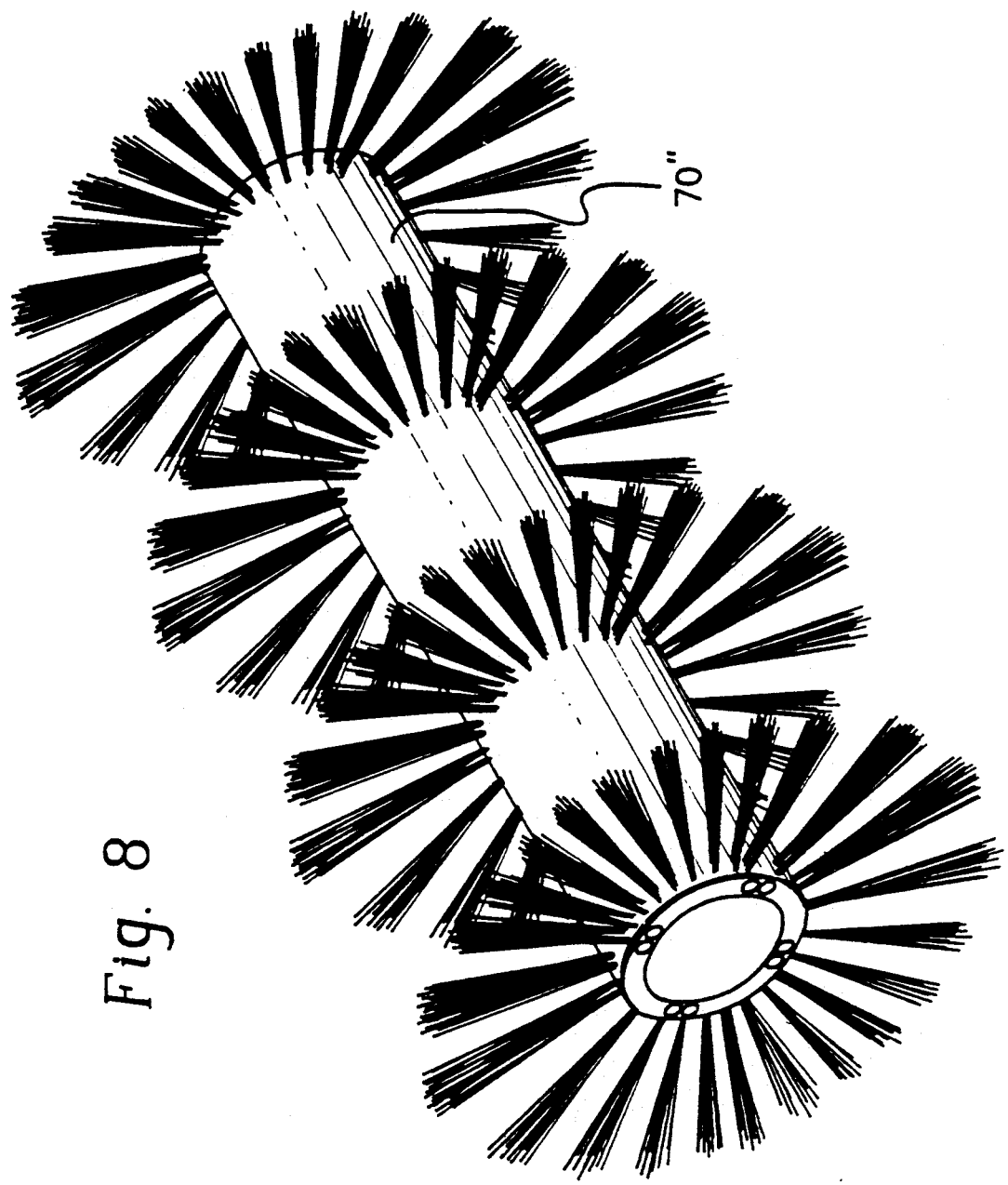
FIG. 8 is an isometric view of an alternate embodiment of the inspection head of the present invention wherein the centering member comprises bristles spaced about the central body of the inspection head.

A different possible centralizing member embodiment is depicted in FIG. 8. In this embodiment, a plurality of grouped bristle type centralizers are used to position the inspection head roughly concentric with the pipe axis. The bristles are stiff enough and numerous enough to support the weight of the camera assembly, but sufficiently flexible to bend towards the body when launching or retrieving the head through the lateral tap hole. With grouped bristles symmetrically arranged about the circumference and spacedly distributed in planes or rows along the length of the inspection head body, the combined cross-sectional area of the bristles in the direction of gas flow can be minimized, thereby reducing impedance of the flow of gas in the operating gas main.

Figure 9:
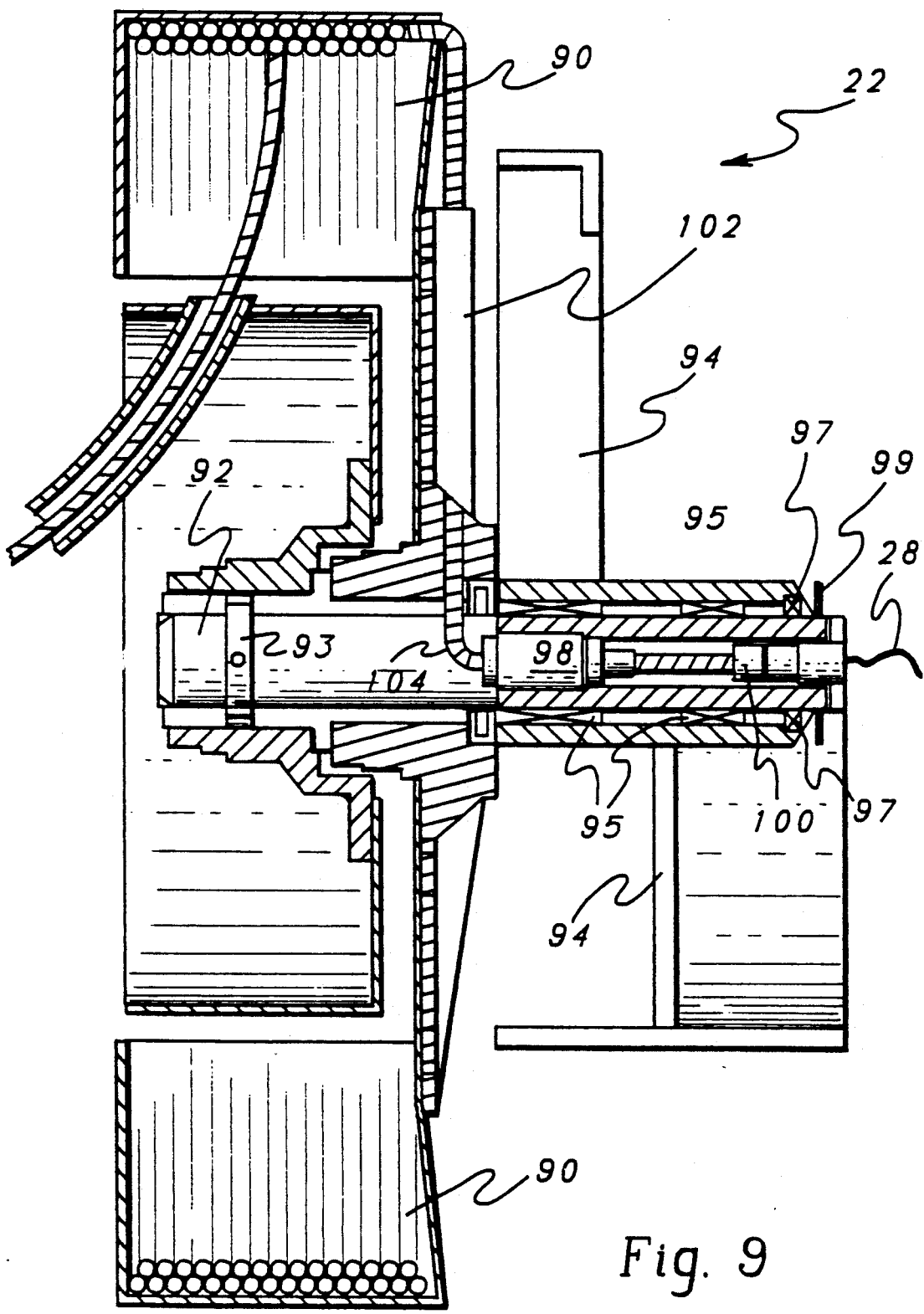
FIG. 9 is an enlarged cross-sectional side elevational view of the storage drum depicted in FIG. 1.

As noted from FIG. 1, steel snake 18 is stored in a rotatable drum 22. A partial cross-sectional view of drum 22 is shown in FIG. 9. Drum 22 comprises one of several commercially available snake storage drums, such as that manufactured by Spartan Tool of Mendota, Ill. and sold as model 1065 Sewer-Raider. In the conventional drum arrangement, the storage section 90 rotates about a shaft 92 secured to the drum housing 94. This configuration is modified pursuant to the present invention by affixing the shaft to the storage sections, e.g., with a pin 93, and allowing it to rotate with respect to the drum housing 94 on bearings 95. A thrust bearing 97 is located at the outer limit of shaft 92 as is a snap ring 99 to hold shaft 92 in place. A central bore 96 is added to the end of shaft 92 extending into housing 94. Within bore 96 is positioned a slip ring 98 and a non-rotating pin connector 100 at the output of slip ring 98.

The end of snake 18 is passed through storage section 90 to a terminal box 102 affixed to the back of the rotating portion of the drum 22. Terminal box 102 contains the connection between the conductors 21 (FIG. 2) carried within snake 18 and the input wires 104 of slip ring 98. The slip ring comprises any commercially available slip ring device such as those manufactured by Litton Poly-scientific of Blacksburg, Va. The output wires from slip ring 98 are connected to pin connector 100. Cabling 28 extends between the output of pin connector 100 (FIG. 9) and control unit 24 (FIG. 1).

Schematic diagrams for certain preferred embodiments of the present invention are shown in FIGS. 10-14.

Figure 10:
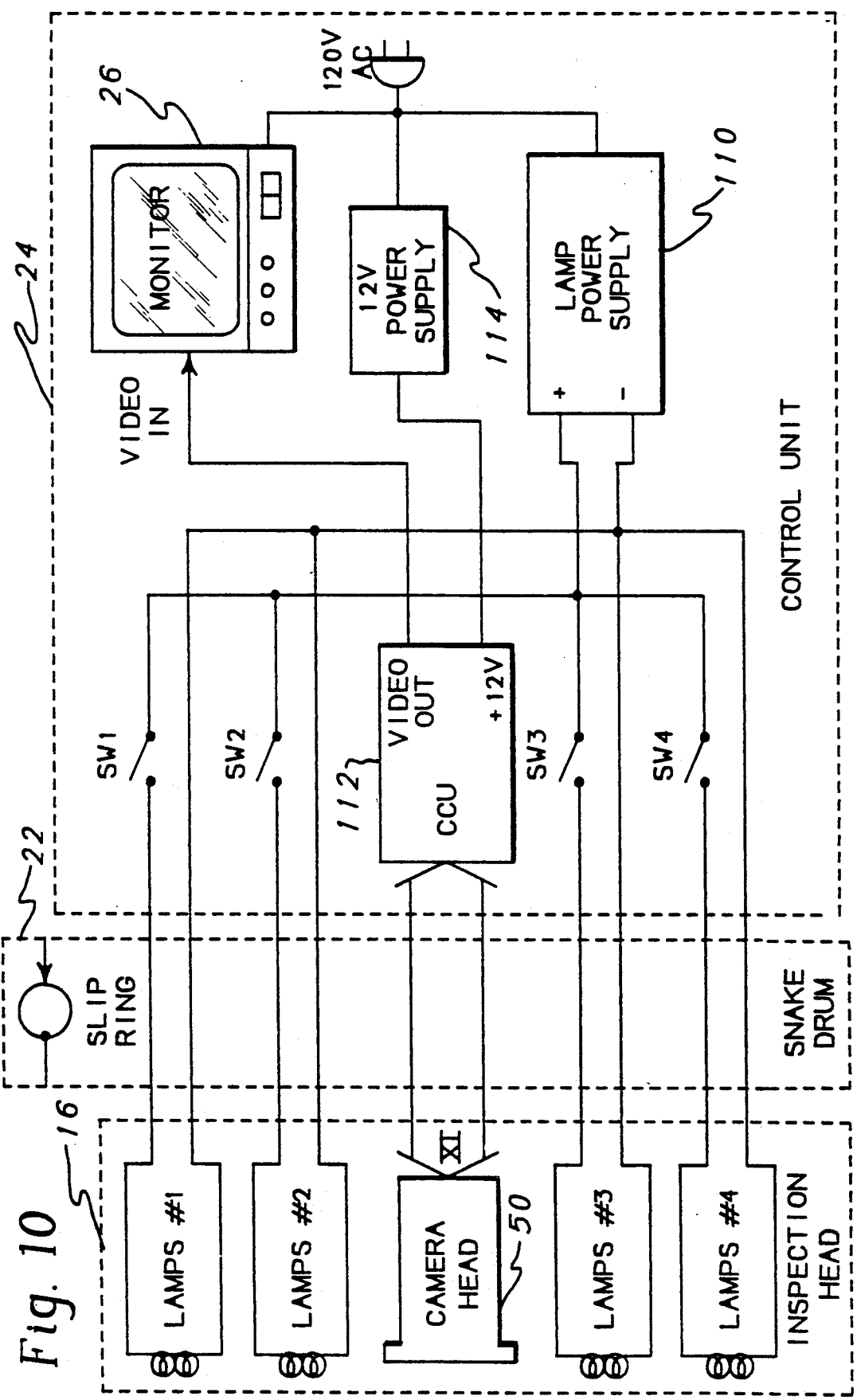
FIG. 10 is a schematic diagram of a non-intrinsically safe circuit embodiment of the present invention.

FIG. 10 depicts an electrical schematic for a non-intrinsically safe inspection system. The lamp units #1-#4 and the camera assembly 50 are located within the hazardous, live gas main when system 14 is in use, while the remainder of the system circuitry is positioned outside the main, e.g., above ground. As noted above, four lamp sets 52, each comprising two lamps in series, are symmetrically arranged about the circumference of lens 54 of camera assembly 50. These four lamp sets are supplied by a power supply 110 through four operator controlled switches SW1-SW4 located within control unit 24, one switch for each light set. The Gilway 4115-1 lamps are rated for 5 volts, however, somewhat greater light output is obtained by driving the lamps at approximately 5.5 volts. In-line switches SW1-SW4 allow the operator to selectively activate or deactivate the lamp sets to enhance features of the inner pipe wall. Since each lamp set requires two wires, a total of eight wires attributable to the illumination system pass through snake 18 and slip ring 98 of snake drum 22 (FIG. 9) to control unit 24.

Also within inspection head 16 is the commercially available Elmo EM-102 B/W CCD camera assembly 50, which has 11 output/input conductors for communication with the camera control unit 112 located within control unit 24. The 11 conductors from camera assembly 50 pass through snake 18 and slip ring 98, to pin connector 100 within shaft 92 of drum 22 (see FIG. 9).

From connector 100, the electrical circuit to unit 24 is completed by non-rotating cabling 28. In this embodiment, the camera control is unmodified from its commercial embodiment. The output of camera control unit 112 is to monitor 26 for real time display of the image from camera assembly 50. A 12 volt power supply 114 powers camera control unit 112. Monitor 26 and power supplies 110 and 114 are driven via a standard 120 volt ac outlet.

Figure 11:
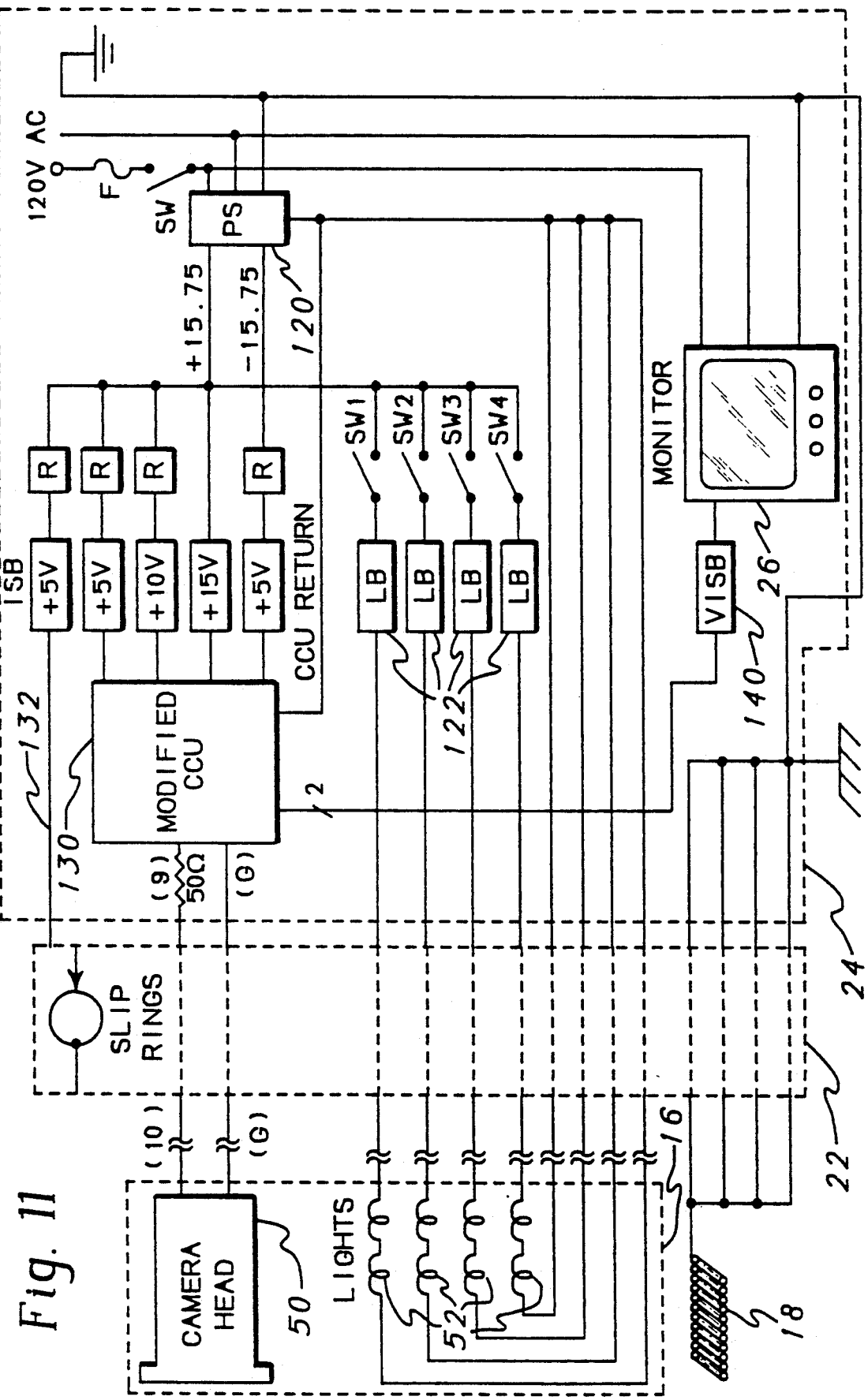
FIG. 11 is a schematic diagram of an intrinsically safe circuit embodiment of the present invention.

As initially noted, the present invention is preferably designed to provide for safe operation of the video inspection system within the potentially explosive atmosphere of an operating gas main. This is accomplished by designing the electrical circuits and selecting the components so that inadvertent ignition of a methane/air mixture is effectively precluded, even if one or two independent worst case failures should occur in series. The preferred approach is to design for "intrinsic safety", wherein the energy storage and dissipation properties of the system are sufficiently low to avoid the possibility of ignition. FIG. 11 is an electrical schematic for one embodiment of an intrinsically safe inspection system. The uniqueness of this system is in its totality of using regulators, barriers and current limiting resistors in each line to the in-line inspection head while maintaining acceptable camera performance.

The inspection head and slip ring assembly connections outside control unit 24 are substantially the same as for the non-intrinsically safe system of FIG. 10, i.e., the head components described above satisfy intrinsic safety requirements. For an intrinsically safe system, however, circuit modifications within unit 24 are needed. In the embodiment shown, a power supply 120 provides a source voltage of $+/-15.75$ volts dc to the camera and lighting systems. In the lamp circuits, again four are shown, power from source 120 initially passes through one of four operator controlled switches, SW1-SW4, and thereafter to one of four identical lamp barrier circuits (LB) 122. Lamp barrier circuits 122 limit the energy capable of passing from source 120 to light circuits 52 within head 16 to a safe level.

Figure 12:
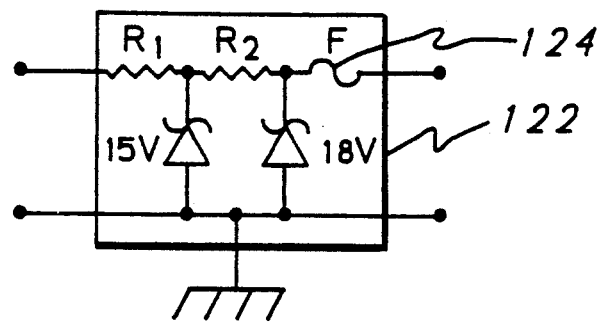
FIG. 12 is a detailed schematic diagram of the lamp barrier of FIG. 11.

One detailed embodiment for lamp barrier 122 is depicted in FIG. 12. Lamp barrier 122 includes a fuse 124 and two Zener diodes (one 15 volts and the other 18 volts) and their corresponding resistors R and $R_2$. Resistors $R_1$ and $R_2$ comprise wire wound flame proof resistors which will burn open with excess current, thereby acting as insurance fuses. (The resistors within circuits 122 require the larger power source 120 than otherwise needed to power the 5 volt lamp sets.) The Zener diodes, which serve to limit voltage, act as insurance in case fuse 124 should short. These diodes serve to limit voltage to a safe level to prevent ignition within the main. Typical resistive values for $R_1$ and $R_2$ are in the range of 10-15 ohms. Of course, actual values for the various components described herein may vary depending upon the circuit constraints and applied intrinsically safe standard.

In the intrinsically safe system circuit of FIG. 11, the camera control unit 130 is modified from the commercially available unit to eliminate all extra unit capacitance without affecting the quality of the visual image. These energy storage sources are removed from the control unit in order for the system to pass intrinsic safety standards. In particular, these energy storage devices were removed to preclude gas ignition should mass fault occur. A mass fault is defined as all the energy storage components simultaneously shorting to ground. If this should occur then the total energy stored within all the energy storage components would be discharged within the explosive atmosphere. Intrinsic safety demands that a mass fault not cause gas ignition.

Also removed from the commercially available camera control unit is the dc to dc converter which produces energy at the various dc levels needed to operate the camera control unit and camera head. The dc-dc converter typically enables larger power ratings than necessary to drive the circuits and it can not be determined with sufficient definiteness what the voltage levels would be within the converter under a fault condition. Therefore, the system circuit depicted in FIG. 11 contains a number of voltage regulators, R, which convert the $+/-15.75$ power from source 120 into the desired levels, namely +5 volts, +10 volts, +15 volts and −5 volts. Those skilled in the art will recognize that there are several regulator circuit embodiments capable of accomplishing this object.

Figure 13:
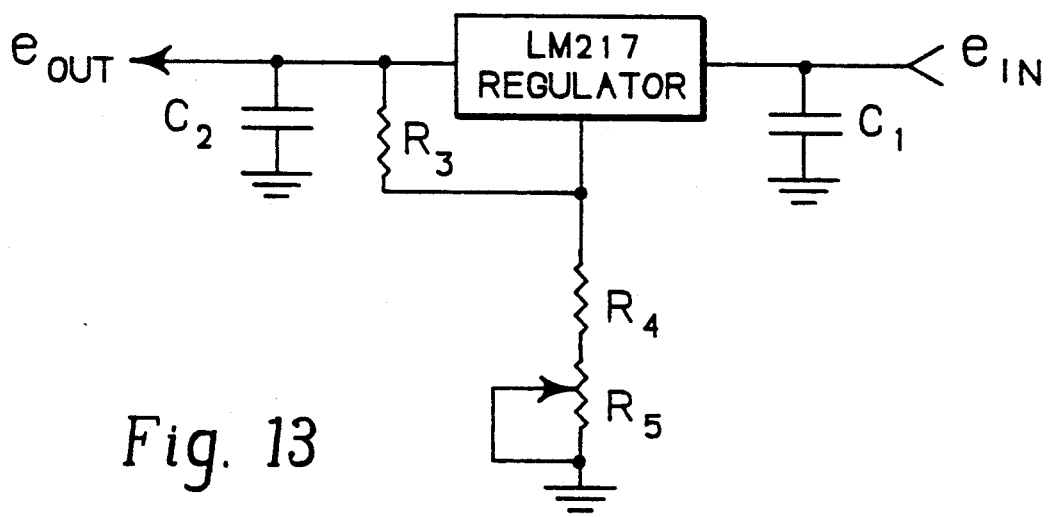
FIG. 13 is a detailed schematic diagram of the regulators of FIG. 11.
Figure 14:
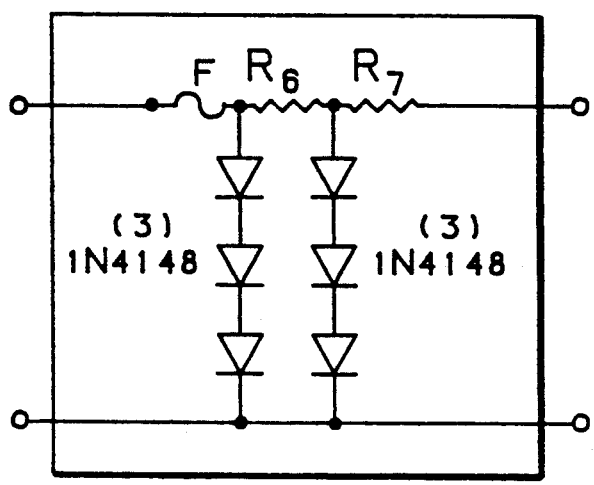
FIG. 14 is a detailed schematic representation of the video isolation barrier of FIG. 11.

A standard three-terminal adjustable voltage regulator embodiment is set forth in FIG. 13. The resistive and capacitive values are selected such that $E_{out}$ is at the desire voltage level. No regulation is required on the 15 volt line since the power supply output is substantially this value. The regulator for a positive voltage is National Semiconductor type LM217, while that for the required negative voltage is either type LM337 or type LM237 depending upon the needed temperature operating range. Appropriate values for resistors $R_3$-$R_5$ and capacitors $C_1$ & $C_2$ for the desired $E_{out}$ can be readily determined by those skilled in the art.

In addition to modifying the camera control unit, a 50 ohm resistor is added to each of the 9 electronic impulse lines from the camera assembly which contain the visual image for processing by the camera control unit. In combination with the balance of the circuit, these 50 ohm resistors present enough series resistance to limit the energy in each line to a nonexplosive condition without significantly affecting the signals returning from camera assembly 50. The tenth and eleventh lines are +5 volts and ground. The +5 volt line 132, which drives the camera assembly 50, is wired external to the camera control unit to eliminate extra capacitance that is generated on the line if it passes through the camera control unit 130. Since there is little energy storage on this line the 50 ohm energy limiting resistor is unnecessary. Intrinsic safety barriers, ISB, are also on each power input line +5 v, +10 v, +15 v and −5 v. These voltage barriers are identical to the lamp barrier circuit depicted in FIG. 12, only the component's values change as needed to meet the intrinsic safety requirements.

From the modified CCU 130 two lines pass to the monitor 26 via a video intrinsic safety barrier assembly VISB 140. Assembly 140 is shown in detail in FIG. 14. As depicted, VISB 140 includes a fuse and duplicate sets of three diodes, type IN4148, in series for shunting excess power from the monitor to ground, thereby preventing it from reaching CCU 130. To meet intrinsic safety standards set by Factory Mutual testing labs of Norwood Massachusetts. Resistors $R_6$ & $R_7$ are 5 ohms, and the fuse is approximately 100-125 mA. Three diodes in series are necessary to provide a sufficiently high turn-on voltage.

Returning to FIG. 11, standard 120 volt ac power is supplied to both source 120 and monitor 26, and earth ground is connected to snake 18 via four lines through the slip ring assembly 98. (Multiple lines are used to reduce the relatively high resistance otherwise encountered at the slip ring.)

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An in-line pipe inspection/repair head comprising:
   a central body; and
   at least three outwardly biased members extending from said body, said members being substantially symmetrically arranged about said body and sized such that when the head is positioned within a pipe said members approximately radially center said body about a central longitudinal axis of said pipe, each of said members comprising at least one spring biased leg pivotally secured to said body and a skid hingedly secured to the free end thereof, each said member being independently collapsible towards said body when said member encounters a pipe obstruction and for facilitating the head's insertion into and removal from the pipe; and
   said central body with said members collapsed thereto being sized for insertion into and removal from the pipe through a lateral opening of diameter smaller than an internal diameter of the pipe.

2. The pipe head of claim 1, wherein said members collapse manually for operator insertion of the head into the pipe through the restricted lateral pipe opening, and further in combination with means for moving the head within the pipe once the head is positioned therein.

3. The pipe head of claim 2, wherein said means for moving the head within the pipe comprises a flexible steel snake having a hollow center.

4. The pipe head of claim 3, further including a first universal connector securing said body to one end of the snake.

5. The pipe head of claim 4, further in combination with a connector tube secured to said body, said tube being secured at a first end to said first universal connector.

6. The pipe head of claim 5, wherein said connector tube is secured at a second, opposite end to said body by a second universal connector.

7. The pipe head of claim 6, wherein said connector tube is of sufficient length for that portion of the snake adjacent to said one snake end connected to said connector tube to substantially rest on a lowermost portion of the pipe.

8. The pipe head of claim 1, wherein said central body includes viewing means for viewing the interior of the pipe.

9. The pipe head of claim 8, wherein said viewing means includes a camera assembly and an illumination assembly for lighting the interior of the pipe.

10. The pipe head of claim 1, wherein the pipe comprises a 4 inch or 6 inch natural gas main and the pipe head is sized when said members are collapsed to allow insertion and removal of the head through a conventional lateral service opening.

11. The pipe head of claim 10, wherein the conventional lateral service opening is 1¼ inch NPT in diameter.

12. The pipe head of claim 1, wherein said central body includes at least three grooves, each of said grooves being sized and positioned for receiving one of said members when said member is collapsed towards said body.

13. The pipe head of claim 1, wherein said lateral opening of diameter smaller than an internal diameter of the pipe comprises a pre-existing lateral service opening.

14. A pipe inspection/repair head comprising:
    an elongate, central body; and
    at least three radially outwardly biased members extending from said body, said members being substantially symmetrically arranged about said body and sized such that when the head is positioned within a pipe said members approximately position said body concentric with a central longitudinal axis of the pipe each of said members comprising at least two bi-directional torsion spring legs, each of said two legs being collapsible towards said body when said legs encounter a pipe obstruction and for facilitating the head's insertion into and removal from the pipe through an opening having a diameter smaller than an internal diameter of the pipe.

15. The pipe head of claim 14, wherein each of said members includes a skid interconnecting the outer radial ends of said two torsion spring legs, each of said legs being hingedly connected to said skid.

16. The pipe head of claim 15, wherein said skid comprises a spring wire and said body includes a plurality of longitudinal grooves, each of said grooves being sized and positioned for receiving one of said members when said members are in a collapsed positioned such that the outer dimensions of said head are minimized.

17. The pipe head of claim 16, wherein said head elongate body includes an illumination assembly and a camera assembly for lighting and viewing an interior of the pipe once the head is positioned therein.

18. Pipe inspection apparatus insertable into a pipeline through lateral opening of diameter smaller than an internal diameter of the pipeline, said apparatus comprising:
    (a) a compact pipe inspection head including:
    i. a central body portion, said body portion including a viewing assembly for imaging the interior of the pipeline;
    ii. at least one centering member affixed to said body portion for substantially radially centering said viewing means within a pipe, said at least one centering member being collapsible towards said body to circumvent a pipe obstruction, to transverse a pipe turn and to facilitate the head's insertion into and removal from the pipe through the restricted lateral pipe opening; and
    ii. said compact pipe head being sized to pass through the lateral opening of smaller diameter than the diameter of the pipe when said centering member is collapsed towards said body; and
    (b) a flexible snake for manually moving the head within the pipe once the head is positioned therein, said snake being sufficiently rigid so as to rotate said head within the pipe, to facilitate movement of the head therein and viewing of the interior of the pipe.

19. The pipe inspection apparatus of claim 18, wherein said viewing assembly includes a camera assembly and an illumination assembly.

20. The pipe inspection apparatus of claim 19, wherein said illumination assembly includes a plurality of lighting sets symmetrically circumferentially arranged about a lens of said camera assembly.

21. The pipe inspection apparatus of claim 18, wherein said centering member comprises at least three outwardly biased centralizing members which extend from said body, said members being substantially symmetrically arranged about said body and each being independently collapsible toward said body, each of said members including at least one spring biased leg pivotably secured to said body and a skid hingedly secured to a radially outer end of said leg.

22. The pipe inspection apparatus of claim 21, wherein said at least three outwardly biased members each include at least two bi-directional torsion spring legs, outer radial ends of said two torsion spring legs being interconnected by said skid.

23. The pipe inspection apparatus of claim 22, wherein said body is elongate and includes a plurality of longitudinal grooves, each of said grooves being sized and positioned for partially receiving one of said members when said members are in a collapsed position to reduce the outer dimensions of said head.

24. The pipe inspection apparatus of claim 23, wherein said skid comprises a spring wire.

25. The pipe inspection apparatus of claim 18, further comprising a rotatable snake storage drum and a control unit having an operator viewable display screen.

26. The pipe inspection apparatus of claim 25, wherein said control unit is located external to said pipeline and wherein said snake includes a hollow center chamber, said unit communicating with said pipe head via electrical cabling passing through said hollow center chamber of said snake.

27. The pipe inspection apparatus of claim 26, wherein said storage drum includes a slip ring for disengaging rotation of said snake and head from said control unit.

28. The pipe inspection apparatus of claim 27, wherein said flexible snake comprises a spiral wound steel snake.

29. The pipe inspection apparatus of claim 25, wherein said pipeline is live and comprises a natural gas main and said apparatus is configured intrinsically safe for operation within said main.

30. The inspection apparatus of claim 29, wherein said control unit includes energy barriers, resistors and voltage regulators for preventing undesirable levels of energy from passing to the head and snake.

31. The pipe inspection apparatus of claim 18, further comprising a connector tube connecting said pipe head to said flexible snake, said connector tube having a universal connection at opposite ends thereof, a first universal connection securing said head to said connector tube and a second universal connector securing said snake to the opposite end of said connection tube, said connector tube being of sufficient length for that portion of the snake adjacent to the tube to be substantially resting on a lowermost portion of the pipe.

32. The pipe inspection apparatus of claim 18, wherein said lateral opening of diameter smaller than an internal diameter of the pipe comprises a pre-existing lateral service opening.

33. The pipe inspection apparatus of claim 32, wherein said pre-existing lateral service opening has a diameter which is less than approximately ⅓ the internal diameter of said pipe.

34. Pipe inspection apparatus insertable into a four inch six pipeline through a standard lateral service opening, said apparatus comprising:
(i) a compact pipe inspection head having a collapsed configuration and an extended configuration, said compact head being sized when in said collapsed configuration to pass through the standard lateral service opening, said opening being substantially less in size than an internal diameter of the pipeline, said compact head also including a viewing assembly for imaging the interior of the pipeline while in said extended configuration; and
(ii) a flexible snake connected to said head for manually moving the head within the pipeline once the head is positioned therein in said extended configuration, said snake being sufficiently rigid so as to permit selective propelling or rotating of the head within the pipe to facilitate movement of the head therein and viewing of the interior of the pipe.

35. The pipe inspection apparatus of claim 34, further comprising a control unit located external to the pipe and having an operator viewable display screen upon which the in-pipe image is projected in real time, and wherein communication between the pipe head and the control unit is accomplished via wires running through a center of the snake.

36. The pipe inspection apparatus of claim 35, wherein said viewing assembly includes a camera and an illumination assembly.

37. The pipe inspection apparatus of claim 36, wherein said illumination assembly comprises a plurality of lighting sets, the activation of each lighting set being controlled by an operator via switches contained in said control unit.

38. The pipe inspection apparatus of claim 34, wherein said lateral service opening is 1¼ inch NPT in diameter.

39. The pipe inspection apparatus of claim 34, wherein said apparatus is intrinsically safe for inspection of a live pipeline.

40. The pipe inspection apparatus of claim 39, further comprising a control unit located external to the pipe, said control unit including energy barriers, resistors and voltage regulators for preventing undesirable levels of energy passing to the head and snake.

41. The pipe inspection apparatus of claim 40, wherein said live pipeline comprises a natural gas pipeline.

42. The pipe inspection apparatus of claim 34, further comprising a universal joint linkage positioned between said pipe head and said snake, said joint linkage facilitating hinging of said head for travel about a corner, and said joint linkage being sized to prevent the weight of the snake from affecting orientation of the head once positioned within the pipe.

43. An in-line pipe inspection/repair head comprising:
a central, elongate body; and
at least three outwardly biased members extending from said elongate body, said members being substantially symmetrically arranged about said body and sized such that when the head is positioned within a pipe said members approximately radially center said body about a central longitudinal axis of said pipe, each of said members including two bi-directional torsion spring legs pivotably secured to said body, each of said two bi-directional torsion spring legs being located adjacent opposite ends of said body, radially outer ends of said two legs being hingedly secured to a skid such that said two legs extend and collapse together, each of said members being independently collapsible towards said body when said member encounters a pipe obstruction and for facilitating the heads insertion into and removal from the pipe through a lateral opening of diameter smaller than an internal diameter of the pipe.

44. The pipe head of claim 43, wherein said body is cylindrical and four biased members extend radially outwardly from said body.

45. The pipe head of claim 44, wherein each of said skids comprises a spring wire.

* * * * *

UNITED STATES PATENT AND TRADEMARK OFFICE
CERTIFICATE OF CORRECTION

PATENT NO. : 5,195,392
DATED : Mar. 23, 1993
INVENTOR(S) : Moore et al.

It is certified that error appears in the above-identified patent and that said Letters Patent is hereby corrected as shown below:

Column 7, line 4, between "2" and "6" insert --.--.

Column 11, line 45, after "R" insert subscript --1--.

Column 12, line 57, delete "IN4148" and substitute therefor --1N4148--.

Column 14, line 54, delete "ii" and substitute therefor --iii--.

Column 16, line 2, between "inch" and "six" insert --or-- and between "six" and "pipeline" insert --inch--.

Signed and Sealed this

Twenty-third Day of November, 1993

Attest:

BRUCE LEHMAN

Attesting Officer         Commissioner of Patents and Trademarks